United States Patent [19]
Lampson

[11] Patent Number: 5,818,039
[45] Date of Patent: Oct. 6, 1998

[54] INCREMENTAL OPTICAL POSITIONING SENSOR

[75] Inventor: Clark E. Lampson, Milton-Freewater, Oreg.

[73] Assignee: Yaskawa Electric America, Inc., Cypress, Calif.

[21] Appl. No.: 768,279

[22] Filed: Dec. 18, 1996

[51] Int. Cl.$^6$ .................................................. G01B 7/287
[52] U.S. Cl. ................................. 250/231.13; 250/208.1; 318/687
[58] Field of Search ........................... 250/231.13, 208.1, 250/208.2; 318/687; 324/207.17, 207.22

[56] References Cited

U.S. PATENT DOCUMENTS

| | | | |
|---|---|---|---|
| 3,735,231 | 5/1973 | Sawyer | 318/687 |
| 3,857,078 | 12/1974 | Sawyer | 318/608 |
| 4,742,219 | 5/1988 | Ando | 250/201 |
| 4,893,071 | 1/1990 | Miller | 324/660 |
| 5,012,089 | 4/1991 | Watanabe | 250/208.2 |
| 5,028,969 | 7/1991 | Kasahara et al. | 250/208.2 |
| 5,324,934 | 6/1994 | Clark | 250/231.13 |
| 5,378,902 | 1/1995 | Pankove et al. | 250/208.2 |
| 5,434,504 | 7/1995 | Hollis et al. | 324/207.17 |

*Primary Examiner*—Stephone B Allen
*Attorney, Agent, or Firm*—Thomas Schneck

[57] ABSTRACT

An imaging system for a linear motor that provides information concerning movement of the same along a plurality of directions, with the information concerning motion along any one direction being substantially unaffected by motion of the motor in a differing direction. In this fashion, a plurality of detectors may be mounted onto the rotor of the linear motor to sense movement along a particular direction, with the detector being insensitive to motion of the motor along a differing direction. The system includes a substantially planar surface, such as a platen, having disposed thereon a pattern forming a two dimensional grid-like array.

20 Claims, 9 Drawing Sheets

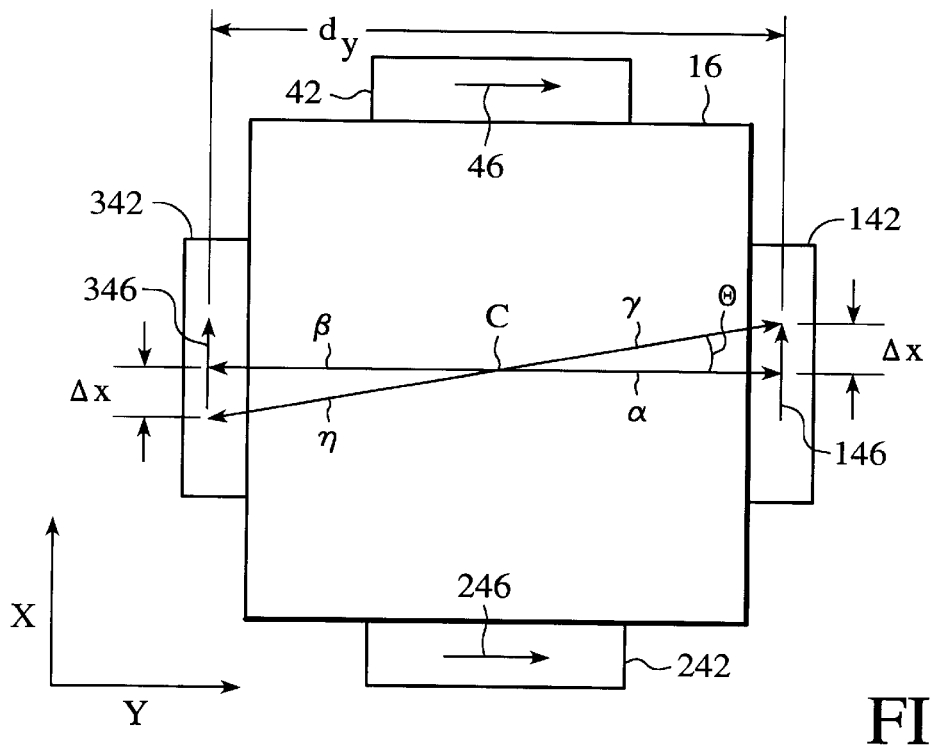
FIG. 7
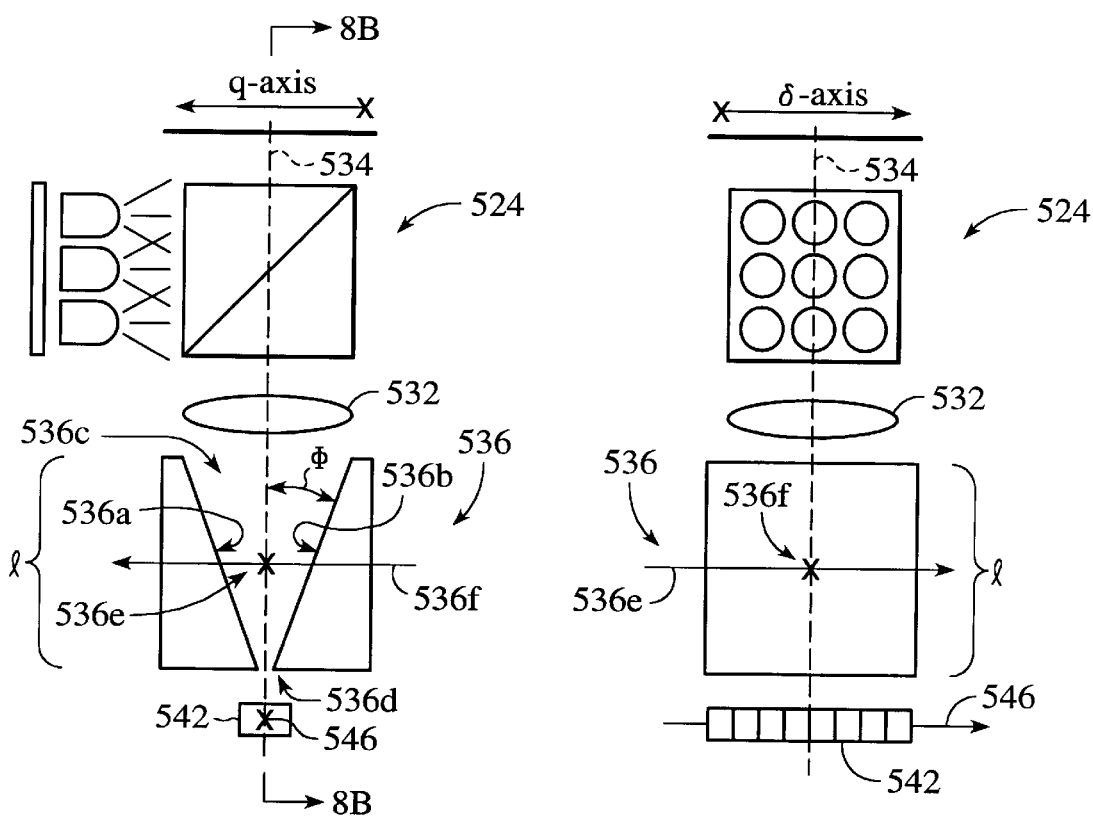
FIG. 8A
FIG. 8B

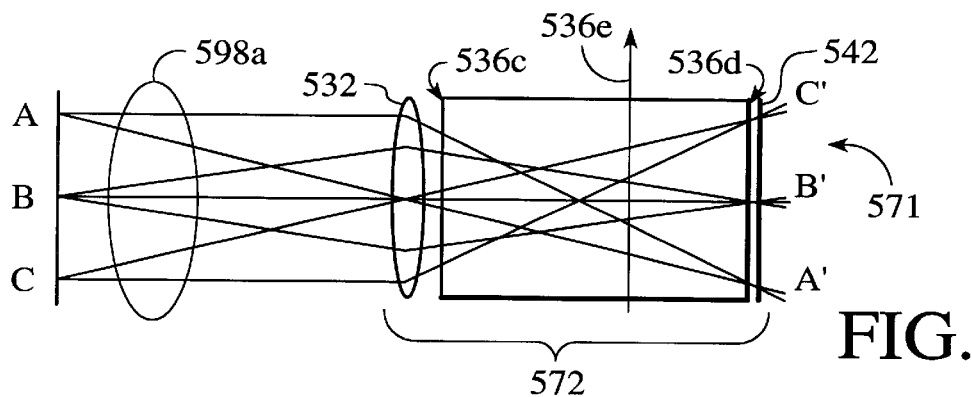
FIG. 9A
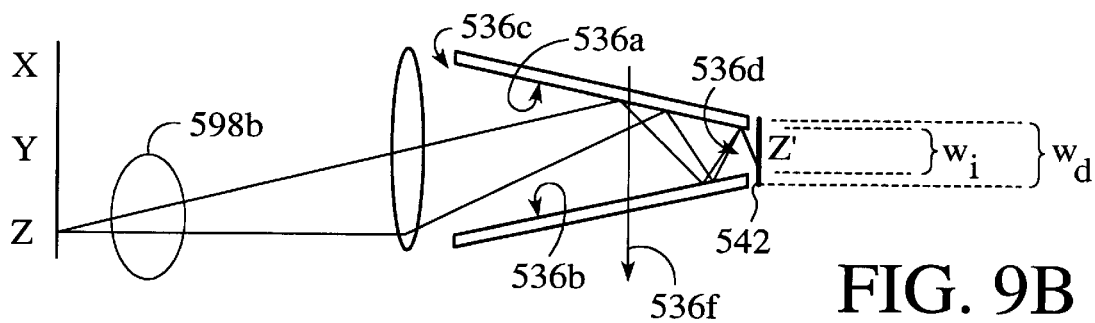
FIG. 9B
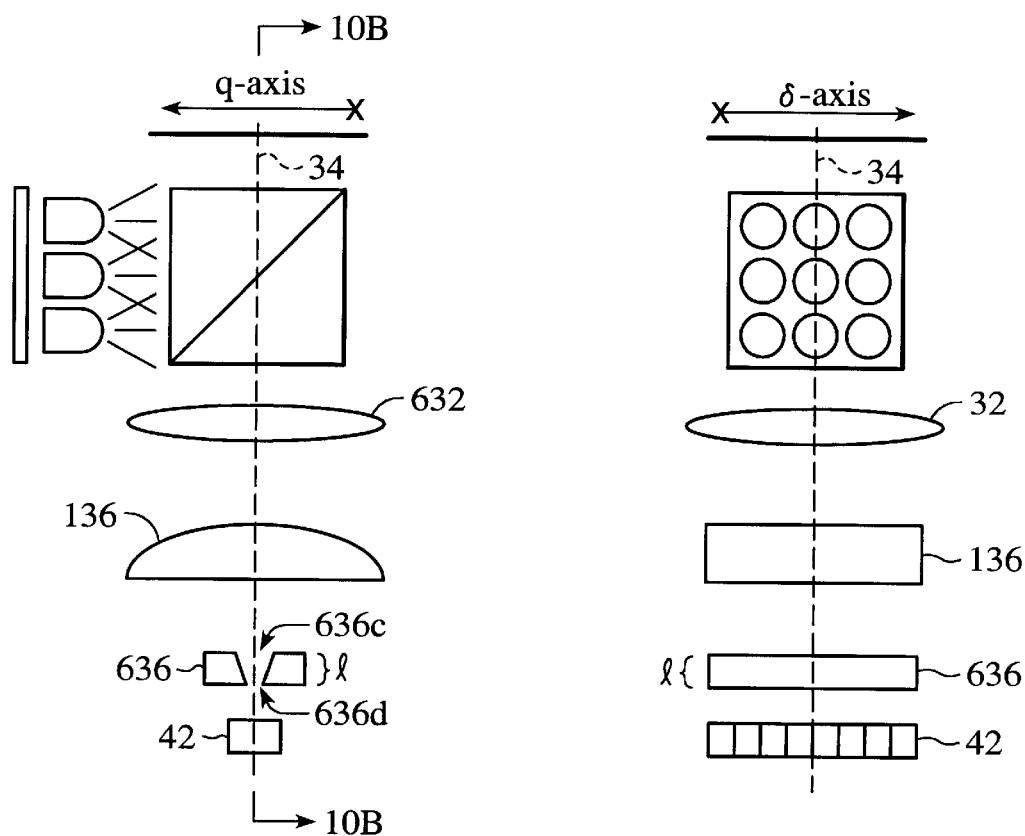
FIG. 10A
FIG. 10B

INCREMENTAL OPTICAL POSITIONING SENSOR

TECHNICAL FIELD

The present invention pertains to the field of position sensitive detectors. Specifically, the present invention pertains to an optical sensor ideally suited for determining the position of a rotor in linear motor systems.

BACKGROUND ART

Well known in the art are linear motor systems in which a rotor is driven across a planar surface, such as a platen, having a plurality of grid lines which forms a two-dimensional array. Considerable effort has been devoted in perfecting such systems to detect, with high precision, the position of the rotor on the platen. In this manner, precise control of the movement of the rotor may be achieved by employing feedback control techniques. Such a system is particularly useful in the field of robotics wherein the movement of, for example, a robotic arm may be achieved. To that end, many prior art detection systems have been developed for linear motor systems.

U.S. Pat. No. 3,735,231 to Sawyer discloses a linear magnetic drive system in which a head is displaced from, but is in contiguous relationship to, a platen. The head is driven relative to the platen along a pair of coordinate axes, thereby forming a motor. The head moves due to a force generated as a result of a change of a magneto-motive vector, e.g., employing induction, hysteresis, or variable reluctance techniques. Detecting the position of the head is achieved by altering the voltage generated by the magnetic flux along certain areas of the platen. For example, the platen may include a layer of soft iron while segments of copper may be disposed at incremental positions in the platen. In this fashion, voltage spikes are generated when the head passes by the copper segments, thereby indicating the rough position of the head on the platen.

U.S. Pat. No. 3,857,078 to Sawyer discloses an improved position detector for a linear magnetic drive system in which the platen includes a plurality of grooves. Magnetic material is disposed between the grooves and projects upward forming a plurality of teeth. The head includes a plurality of pick-offs. The pick-offs may include magnetic cores having pole pieces which are grooved to form teeth. The pitch of the teeth of the pole pieces correspond to the pitch of the teeth formed in the platen. In this fashion, the reluctance between the teeth of the pole pieces and the teeth of the platen may be used to determine the position of the head with respect to the platen.

U.S. Pat. No. 4,893,071 to Miller discloses a capacitive incremental position measurement and motion control system that includes a plurality of electrodes that are moved simultaneously, defining a sensor. The electrodes are positioned proximate to a patterned monolithic reference ground plane, i.e., a platen, of arbitrary size. The position of the electrode with respect to the platen is determined by making continuous multiple capacitive measurements of the platen itself. The system is described as extending directly to linear, planar rotational and cylindrical position measurement and motion control. A plurality of sensors may be employed, each of which detects motion in a single direction, without detecting movement of the remaining directions of movement. The aforementioned systems are suitable for their intended purpose, but require that the detection systems be manufactured from specific materials to ensure proper coupling, i.e., electric or magnetic, to the platen.

U.S. Pat. No. 5,324,934 to Clark discloses a fiberoptic encoder to determine the position, velocity and direction of movement of a linear motor. The encoder includes two channels, each of which has two bundles of optical fiber. The first end of the optical fiber of each of the bundles is disposed within a narrow elongated slit. One of the bundles conveys light directed upon the opposite end of the bundles to a surface adjacent to the slit. The linear motor moves along this surface. The remaining bundles convey light reflected from the surface to a sensor which converts the intensity of the reflected light into an electrical signal. The slits must be spaced appropriately, relative to the pitch of the platen pattern, so that the position and direction of the encoder can be calculated relative to the platen. Specifically, changes in the reflectivity of the platen pattern is detected and analyzed using a conventional quadrature technique to determine the encoder position. This design necessitates custom manufacturing of the slits to match the pitch of the platen pattern.

U.S. Pat. No. 4,742,219 to Ando discloses an apparatus for detecting the focusing and positional accuracy of a light beam directed onto an optical disk tracking guide. The apparatus includes, in pertinent part, an optical head to direct a laser beam onto a light reflecting layer of an optical disk. As the beam propagates toward the optical disk, it passes through an objective, causing it to focus onto the reflecting layer. Light reflected therefrom is collected by the objective and directed through a projection lens, a cylindrical lens and onto a light-receiving surface. The projection lens-cylindrical lens combination provides an optical system having two focal planes: long and short. The light-receiving surface is disposed at one of the two focal planes and includes four rectangular photosensitive regions. The focusing state of the objective lens is determined by sensing the position of the beam amongst the four photosensitive regions of the light-receiving surface.

U.S. Pat. No. 5,378,902 to Pankove et al. discloses an apparatus to determine the physical location, among a two dimensional area, of a maximum intensity of an optical signal amongst a plurality of optical signals. A two-dimensional network of light sensitive, solid state, pnpn devices are connected, to each other, in parallel and in series with a load resistor. The load resistor is connected to a common source of operating voltage. In this fashion, the magnitude of the applied operating voltage determines the optical light intensity signal threshold that will activate an individual light sensitive device within the two-dimensional network. In one embodiment, two cylindrical lenses are disposed to be orthogonal to one another. The two-dimensional network is optically coupled to two linear CCDs through the cylindrical lenses. Neither Ando's invention nor Pankove et al.'s invention provide accurate information concerning the position of a body in motion.

What is needed is a detection sensor for a linear motor which is capable of operation with a variety of platen surfaces that can provide information concerning the position of a rotor with respect to the platen, with high precision.

SUMMARY OF THE INVENTION

The present invention features a system for a linear motor that provides information concerning movement of the same along a plurality of directions with the information concerning motion along any one direction being substantially unaffected by motion of the motor in a differing direction. In this fashion, a plurality of detectors may be mounted onto the rotor of the linear motor to sense movement along a particular direction with each detector being insensitive to motion of the rotor along a differing direction. The system includes a substantially planar surface, such as a platen, having disposed thereon an optically contrasting pattern which is periodic in two dimensions. The rotor, typically referred to as a head, is disposed proximate to the platen and has mounted thereon an imaging system that includes a plurality of optical channels positioned to detect movement along two transverse directions. Each optical channel includes an objective lens assembly, an anamorphic filtering system, and a detector. For purposes of this application, an anamorphic filtering system is defined as a system that produces data corresponding to an image so that the resolution of data along a first direction is maintained while the resolution of data corresponding to a transverse direction is reduced. In the preferred embodiment the anamorphic filtering system includes an anamorphic imaging assembly that comprises a cylindrical lens having a major axis, lying in an unpowered plane, and a minor axis, lying in a powered plane. The powered plane is the plane in which the cylindrical lens magnifies and demagnifies an image. Light rays traveling in the unpowered plane are substantially unaffected by the cylindrical lens. The detector is formed from a one-dimensional array of light sensing elements arranged along a longitudinal axis. The detector is positioned to sense movement of the head along a particular direction, which is parallel to the longitudinal axis.

A source of light is provided which illuminates a portion of the platen. The collection lens is disposed proximate to the platen and collects light reflected and scattered therefrom corresponding to the area illuminated. The collected light is directed through the cylindrical lens. The unpowered plane of the cylindrical lens is orientated to extend parallel to the longitudinal axis of motion and leaves unaltered the image of the illuminated area in the longitudinal direction. The transversely oriented powered plane compresses the image of the illuminated area in a direction transverse to the longitudinal axis. In this fashion, the cylindrical lens images onto the detector an image maintaining an accurate representation of periodicity of the illuminated area in only one dimension. By removing information concerning periodicity, as described above, the detector is insensitive to movement in the powered plane. The detector produces a generally digitized signal which approximates a sinewave that corresponds to the collected light sensed.

The digitized signal is cross-correlated with two signals representing a sine and cosine of a frequency which corresponds to the pitch of the grid of the pattern. The ratio of these correlation sums is used to compute an inverse tangent to determine a fractional phase angle. The fractional phase angle provides the exact position of the head within one pitch. A wrapping function is computed in which the current fractional phase angle is compared to the previous fractional phase angle. If the magnitude of the difference between the current and previous fractional phase angles exceeds a predetermined quantity, an integer count is incremented or decremented in a counter. The precise position of the head with respect to the platen is determined by summing the number of integers present in the counter with the current fraction phase angle. This information may be used in a closed loop feedback network to control the movement of the head, as well.

In an alternate embodiment, the anamorphic imaging assembly employs a one-dimensional concentrator. The concentrator consists of two spaced apart planar mirrors which face each other and are inclined at a shallow angle relative to a normal to the powered plane. The one-dimensional concentrator may be employed in conjunction with, or in lieu of, the cylindrical lens. In other embodiments, the anamorphic filtering system employs data manipulation to reduce information corresponding to a particular axis. To that end, data manipulation may be accomplished using specialized computer programs or pixel binning techniques associated with CCD arrays.

BRIEF DESCRIPTION OF THE DRAWINGS

FIG. 7 is a plan view of the linear motor shown in FIG. 1 employing four optical channels, shown in FIGS. 2A and 2B.

FIG. 8A is a side plan view of the optical channel shown in FIGS. 2A and 2B in accord with an alternate embodiment.

FIG. 8B is a side plan view of the optical channel shown in FIG. 8A taken along lines 8B—8B.

FIGS. 9A and 9B are ray-trace diagrams showing the anamorphic properties of a one-dimensional concentrator employed in the optical channel shown in FIGS. 8A and 8B, with FIG. 9A showing light rays being substantially unaffected by the one-dimensional concentrator in a first plane, and FIG. 9B showing light rays being compressed in a second plane, orthogonal to the first plane.

FIG. 10A is a side plan view of the optical channel shown in FIGS. 8A and 8B in accord with an alternate embodiment.

FIG. 10B is a side plan view of the optical channel shown in FIG. 10A taken along lines 1OB—10B.

BEST MODE FOR CARRYING OUT THE INVENTION

Figure 1:
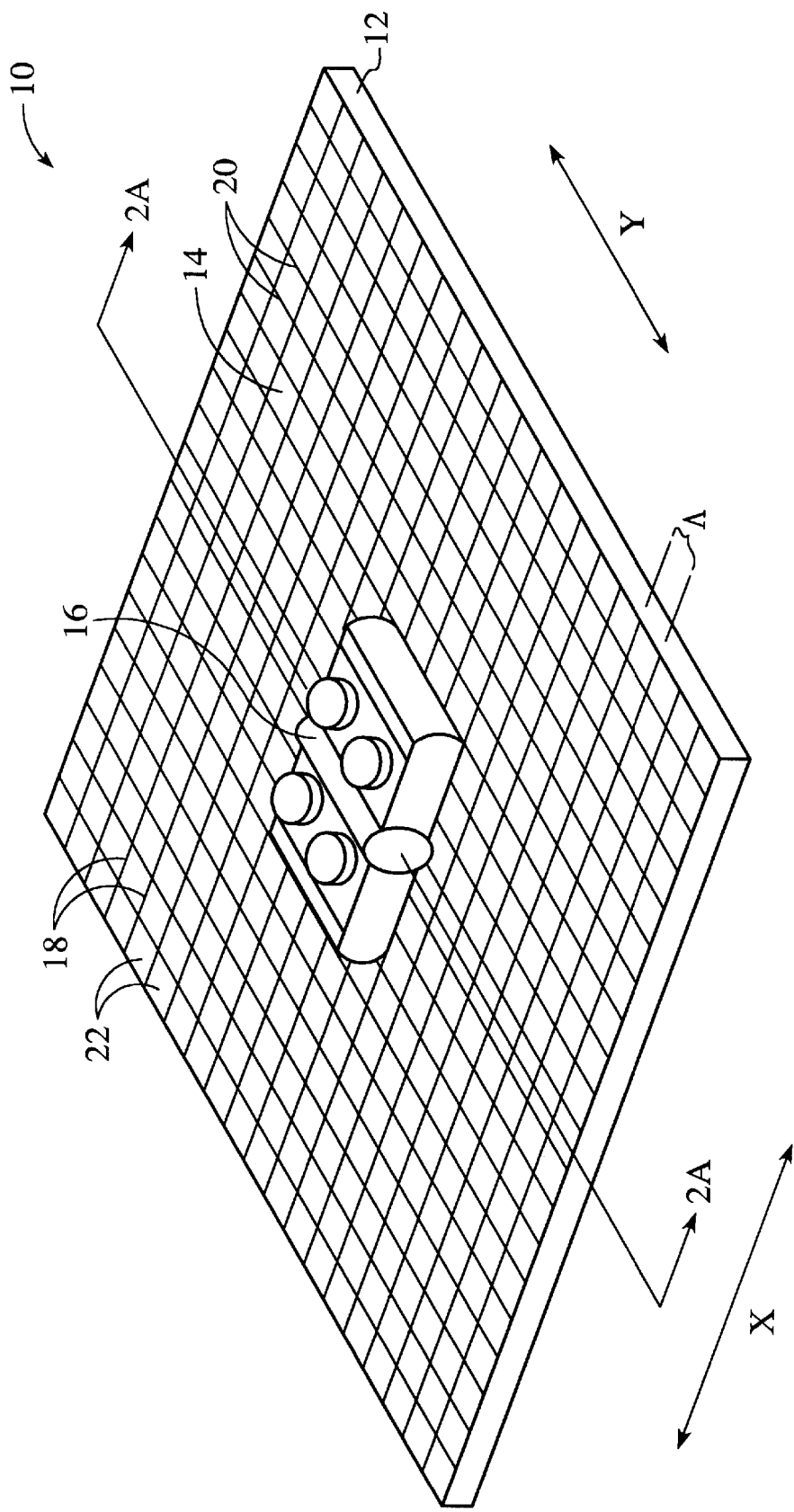
FIG. 1 is a perspective view of a linear motor employing an optical detection system in accord with the present invention.

FIG. 1 shows a linear motor 10, such as a Sawyer motor, which includes a generally planar surface 12 commonly referred to as a platen. An example of a Sawyer motor is described in U.S. Pat. No. 5,434,504 to Hollis et al. Platen 12 is typically formed from a ferromagnetic material and includes a pattern 14 which is periodic in two dimensions, defining a two-dimensional array or grid-like pattern. A head 16 is disposed spaced apart from, but in contiguous relationship with respect to, platen 12 and is movable relative thereto. In this fashion, head 16 functions as a rotor and platen 12 functions as a stator of linear motor 10.

Pattern 14 is typically formed from a first plurality of spaced apart and parallel grooves 18 extending along a first direction, defined as the X direction and a second plurality of spaced apart and parallel grooves 20 extending along a direction orthogonal to the X direction, defined as the Y direction. Grooves 18 and 20 intersect at various points on platen 12, forming a plurality of protrusions 22, referred to as teeth. Preferably, teeth 22 are all identical in size, with the spacing between any two adjacent teeth 22 defining pitch A. Grooves 18 and 20 are typically filled with a suitable non-magnetic material and the surface is machined and polished to provide a smooth finish. This structure provides grooves with optical characteristics that differ from the optical characteristics of teeth 22. Specifically, the coefficient of reflectivity of teeth 22 is greater than the coefficient of reflectivity of grooves 18 and 20. However, the relative coefficient of reflectivity between teeth 22 and grooves 18 and 20 may be reversed.

Figure 2A:
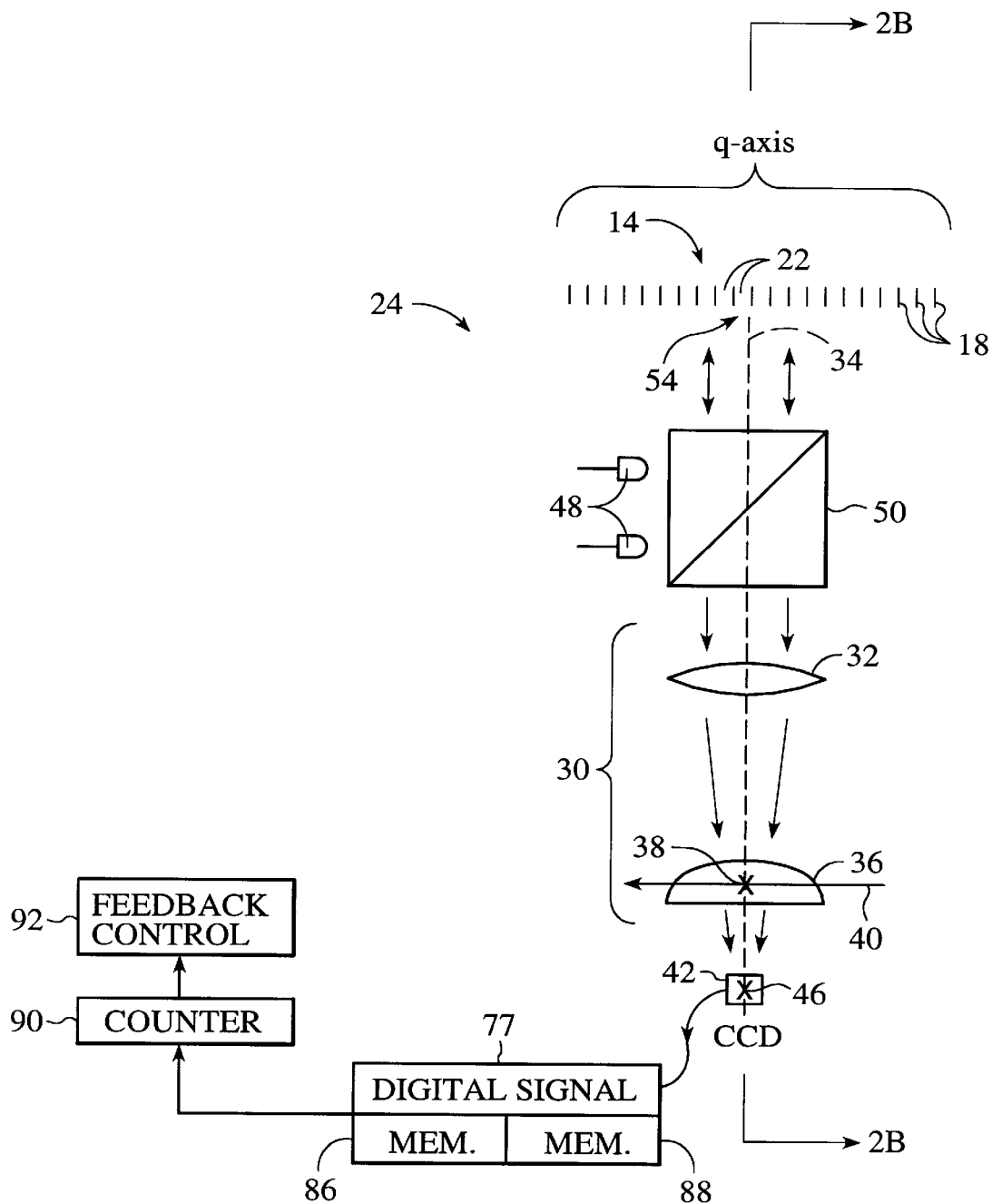
FIG. 2A is a side plan view of an optical channel as shown in FIG. 1, taken across lines 2A—2A.
Figure 2B:
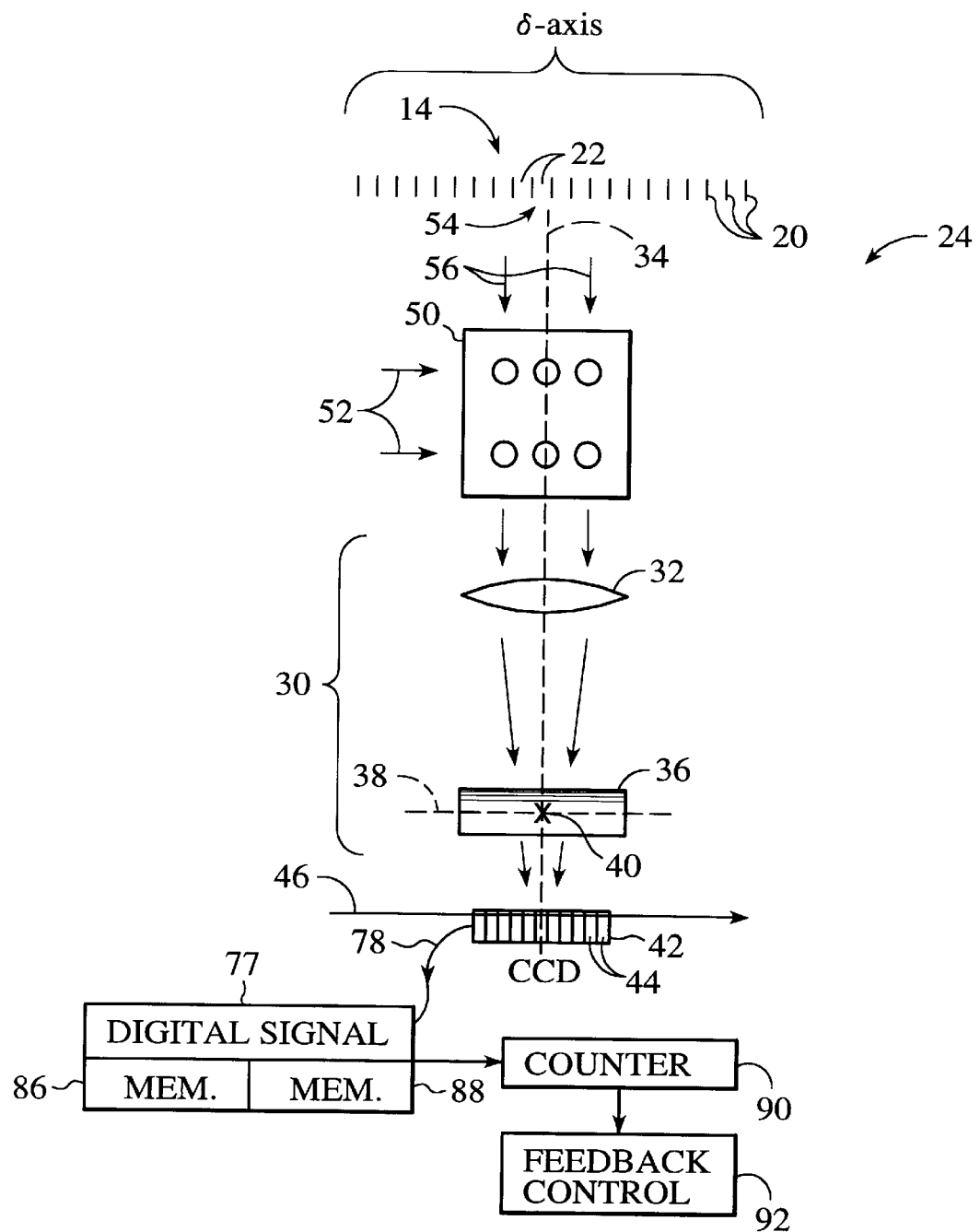
FIG. 2B is a side plan view of the optical channel shown in FIG. 2A taken along lines 2B—2B.

Referring to FIGS. 1, 2A and 2B, an optical channel 24 is shown which provides positional information of head 16 with respect to platen 12. Optical channel 24 is attached to head 16 so as to be in optical communication with pattern 14. Channel 24 is adapted to sense movement of head 16 along one direction, defined as a direct ($\delta$-axis), while being insensitive to movement along a transverse direction, defined as a quadrature (q-axis). Optical channel 24 includes a relay lens assembly 30 comprising an objective lens 32, defining an optical axis 34, a cylindrical lens 36, having a major 38 and a minor 40 axes. A detector 42 is disposed in the optical axis 34. Objective lens 32 may be formed of one or more optical elements to relay light from platen 14 to create an image on detector 42. Detector 42 consists of a one-dimensional array of light sensing elements 44 arranged along a longitudinal axis 46. Any type of sensing element may be employed in detector 42, e.g., photodiodes, photo-capacitor or photo-conductors.

Figure 3:
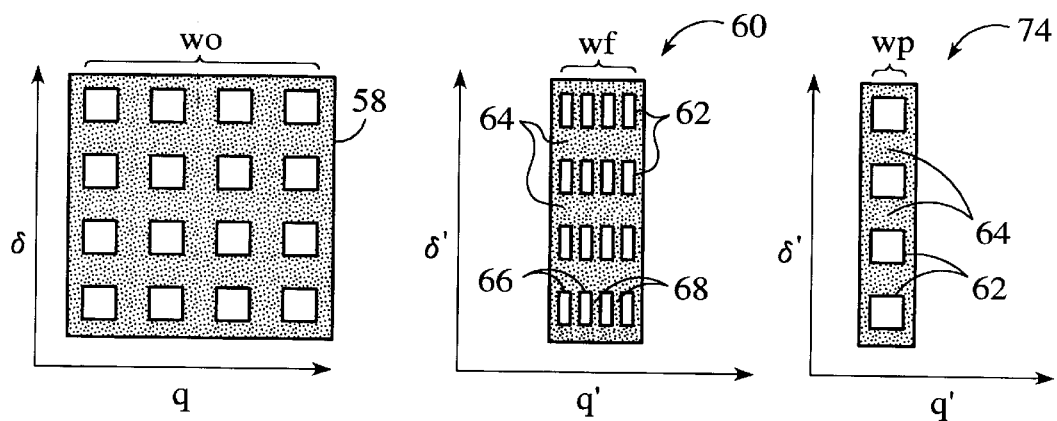
FIG. 3 is a plan view of an image of a platen associated with the linear motor shown in FIG. 1.

A light source 48 is optically coupled to both pattern 14 and relay lens assembly 30 via a beam splitter 50, or other light separating means such as a half-silvered mirror, positioned along optical axis 34. Although any light source may be used, such as a gas laser, a laser diode or a halogen light, it is preferred to employ light emitting diodes. Light source 48 is positioned off optical axis 34 and produces light 52 that is directed to illuminate an area 54 of platen 12. Area 54 typically includes a plurality of teeth 22 which produce reflected or scattered light 56 that corresponds to an object 58 of area 54 having periodicity in two dimensions, shown more clearly in FIG. 3. Referring again to FIGS. 1, 2A and 2B, objective lens 32 collects reflected light 56 and directs the same onto cylindrical lens 36. Cylindrical lens 36 directs collected light 56 onto detector 42.

The best mode optical relay lens assembly 30 consists of a multi-element objective lens group 32 followed by a multi-element cylindrical lens group 36. The cylindrical lens elements 36 introduce an anamorphic imaging function along the optical axis 34 which, working in conjunction with detector 42, are chosen so as to eliminate sensitivity of channel 24 to movement of the head along the q-axis while maintaining sensitivity to movement along the $\delta$-axis. Typically, cylindrical lens 36 provides unity magnification along the $\delta$-axis, but greatly reduces, or demagnifies, and defocuses the image along the q-axis.

Figure 4:
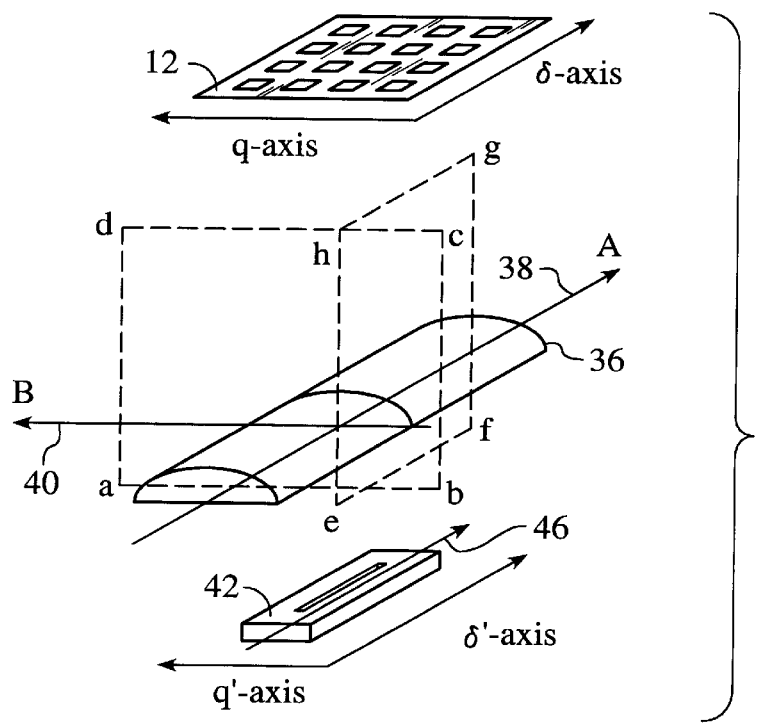
FIG. 4 is a perspective view showing the optical properties of a cylindrical lens employed in the optical detection system shown in FIGS. 2A and 2B.

Referring to FIG. 4, platen 12 lies in the object plane, and major axis 38 and minor axis 40 of cylindrical lens 36 are arranged to position the powered plane, denoted by points a-b-c-d, so as to extend in a direction parallel to the q-axis, while the unpowered plane, denoted by points e-f-g-h, extends in a direction parallel to the $\delta$-axis.

Referring to FIGS. 2A, 2B, 5A, 5B, and 5C, lens assembly 30 has two different image distances associated with the two different focal lengths introduced by the powered and unpowered planes of cylindrical lens 36. For a fixed object distance 12a between platen 12 in the object plane and objective 32, there exists a first image distance 72 between objective 32 and the focused image plane 71 in the unpowered plane, shown more clearly in FIG. 5A. For the same fixed object distance 12a, a second image distance 70 exists between objective 32 and focused image plane 73 in the powered plane, shown more clearly in FIGS. 5B and 5C.

Figure 5A:
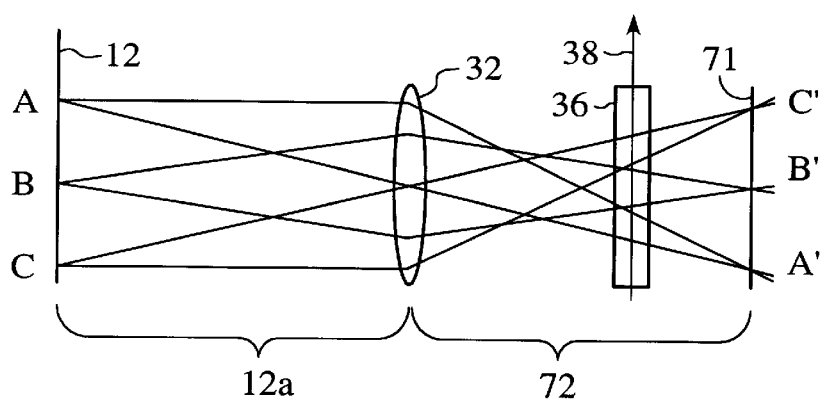
FIGS. 5A, 5B, and 5C are ray-trace diagrams showing the anamorphic properties of the cylindrical lens, shown in FIGS. 2A and 2B, with FIG. 5A showing light rays being substantially unaffected in a first plane, FIG. 5B showing light rays being compressed in a second plane, orthogonal to the first plane and FIG. 5C showing details of the light rays shown in FIG. 5B in the region of the detector.

Referring to FIG. 5A, light rays emanate from points A, B, and C, located in the object plane, travel parallel to the unpowered plane and are focused to points A', B' and C' lying along image plane 71 located at image distance 72. These light rays are substantially unaffected by cylindrical lens 36.

Figure 5B:
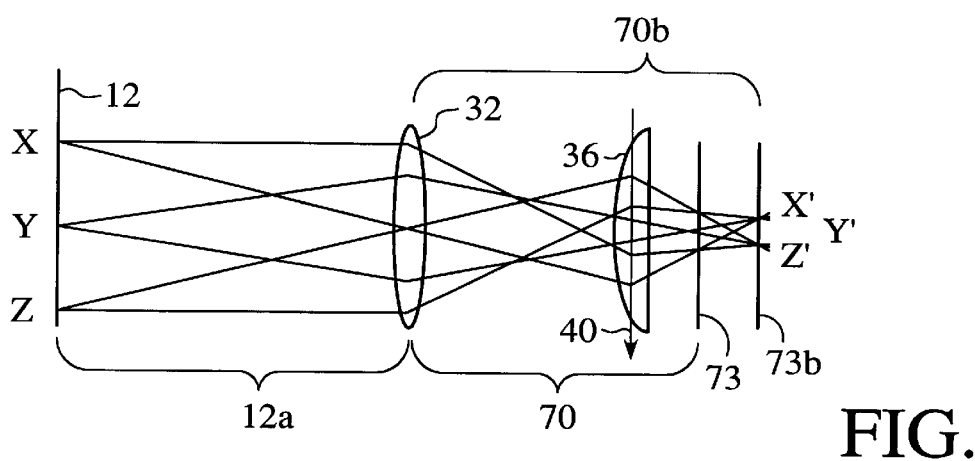
Figure 5C:
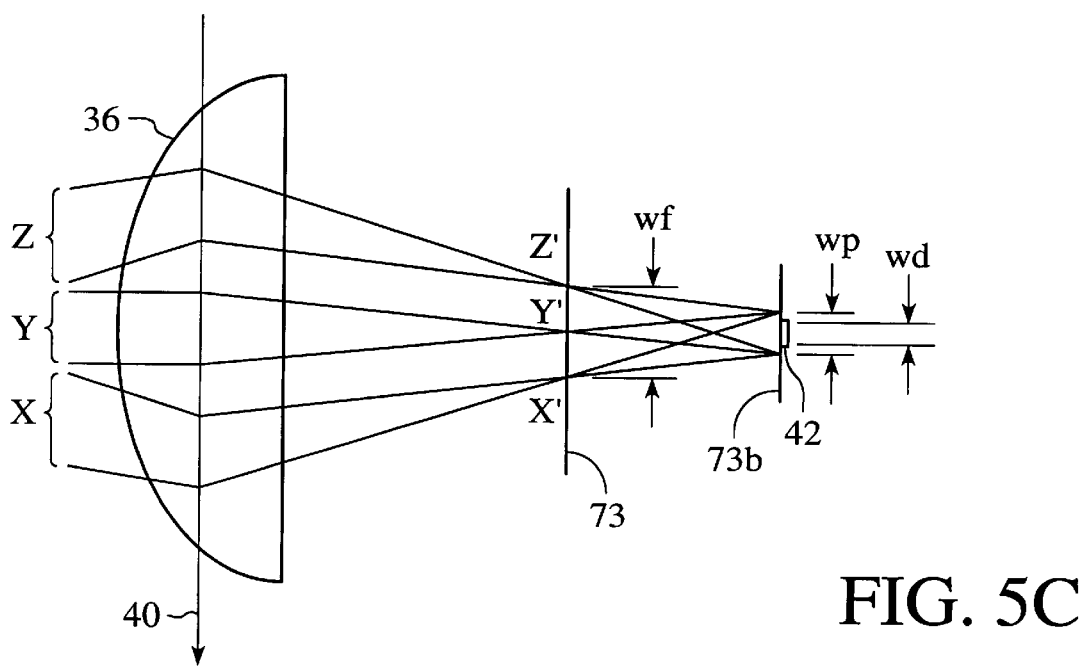

Conversely, as shown in FIGS. 5B and 5C, light rays emanating from points X, Y and Z, in the object plane, travel parallel to the powered plane and are focused to points X', Y' and Z' lying along image plane 73. Image plane 73 is located at a shorter image distance 70 due to refraction by cylindrical lens 36. As light rays from individually focused image points X', Y' and Z' continue past image plane 73, they diverge, while the overall light bundle converges to a minimum at an exit pupil plane 73b of the powered plane located at exit pupil distance 70b. The exit pupil plane 73b of the powered plane of relay lens assembly 30 is the optimal location for detector 42 since the pupil width "wp" is a minimum for the optical system which results in maximum light intensity at this aperture, and the image at the pupil contains no information in the q'-axis since light rays from any point on the object are spread across the pupil.

Referring to FIGS. 5A, 5B and 5C, if detector 42 is located in exit pupil plane 73b, then detector pixel width "wd", as measured transverse to the longitudinal axis 46, may be made less than "wp", the exit pupil width. If detector 42 is located at focused image plane 73, then detector pixel width "wd" must be at least as large as "wf", the focused image width at plane 73 to achieve image averaging in the q'-axis. The cost of detector 42 is typically proportional to detector area, therefore minimizing detector width "wd" is preferred.

Referring to FIGS. 1, 2A, 2B, 3 and 5B, for an object image appearing as 58 lying on platen surface 12, lens assembly 30 produces image 60 at image plane 73 and image 74 at exit pupil plane 73b. Image 60, located at image plane 73, includes a first set of a plurality of high intensity 62 and low intensity 64 areas produced at periodic intervals parallel to the $\delta$'-axis. A second set of high intensity 66 and low intensity 68 areas are produced at periodic intervals parallel to the q'-axis direction. The corresponding image 74 produced at exit pupil plane 73b includes only a first set of a plurality of high intensity 62 and low intensity 64 areas at periodic intervals parallel to the $\delta$'-axis.

Exit pupil distance 70b of the powered plane of lens assembly 30 is optimally designed to coincide with image distance 72 of the unpowered plane of lens assembly 30. In practice, this is achieved by first designing objective 32 for a given object distance 12a and image distance 72 in the unpowered plane. Then the cylindrical lens 36 is designed to have the exit pupil distance 70b coincide with the image distance 72. This produces an image 74 which is one-dimensional in nature, containing sharply focused information in the δ'-axis and no information in the q'-axis. In practice, it may be desired to slightly defocus image 74 in the δ'-axis to increase numerical processing precision of the resulting data. This is accomplished by designing the exit pupil distance 70b to differ slightly, either shorter or longer, from the image distance 72. In response to image 74 sensed, detector 42 produces a signal corresponding thereto. The signal is discussed more fully below with respect to FIG. 6.

Figure 6:
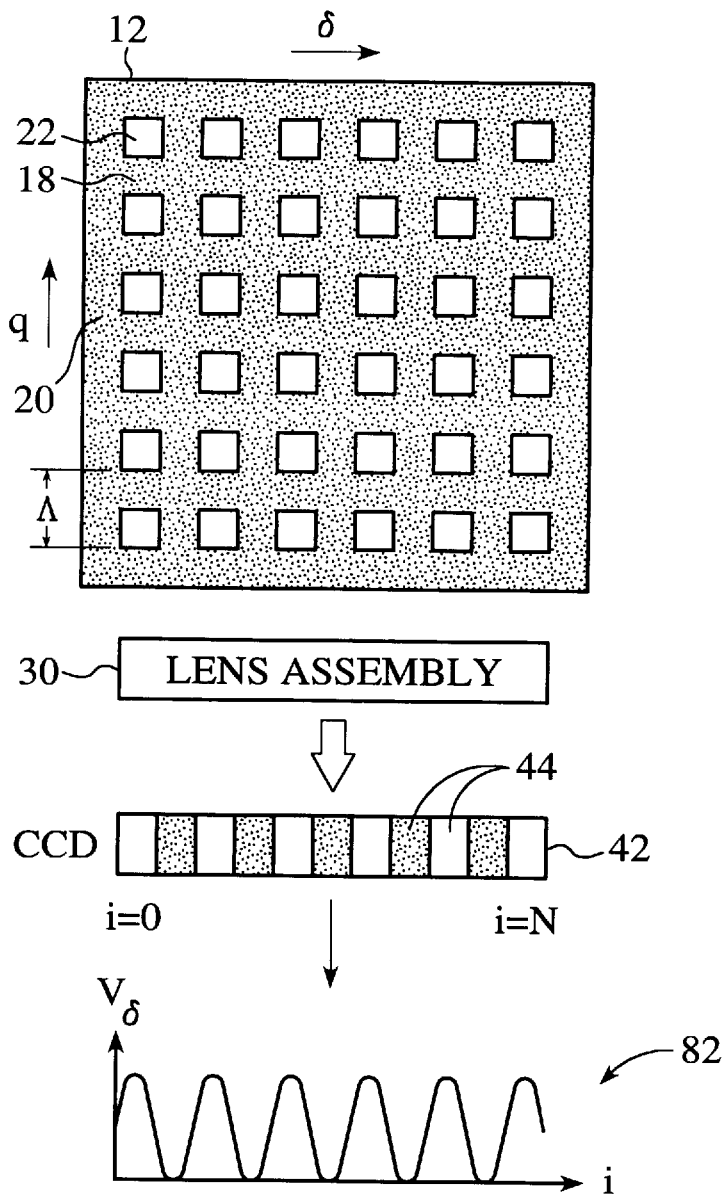
FIG. 6 is a detailed plan view of the optical detection system shown in FIGS. 1, 2A and 2B demonstrating the conversion of optical information into electrical signals.

Referring to FIGS. 2A, 2B and 6, digital signal processor 77 samples and digitizes signal 82 produced by detector 42. Typically, the number of data samples corresponds to the number of light sensing elements 44 in detector 42. Two cross-correlation sums, between two stored reference waveforms, and the digitized version signal 82 are computed. With respect to information concerning movement along the δ-axis, the cross correlation sum consists of the real and imaginary solutions to the continuous Fourier transforms defined as follows:

$$F(s) = \int_{-\infty}^{\infty} f(\delta)e^{-i2\pi\delta s}d\delta \quad (1)$$

However, it was found that the real and imaginary solutions for equation (1) required an enormous amount of computing power which substantially increased the cost of the system. To simplify the computational requirements, it was found that solving equation (1) at the frequency defined by the pitch Λ would provide positional information of head 16 with respect to platen 12. To that end, a first memory 86 includes a program operated on by processor 77 to compute the real solution of equation (1) as follows:

$$F_R(s_p) = \sum_{k=1}^{n} f(k)\cos 2\pi k s_p \quad (2)$$

where f(k) is the digitized version of waveform 82, cos $2\pi k s_p$ is a reference waveform stored in memory 86 which is in electrical communication with processor 77, and n is generally equal to the number of light sensing elements 44 in detector 42. The imaginary solution to equation (1) is defined as follows:

$$F_I(s_p) = -i\sum_{k=1}^{n} f(k)\sin 2\pi k s_p \quad (3)$$

where f(k) is the digitized version of waveform 82, sin $2\pi k s_p$ is a second reference waveform stored in memory 86 and n is generally equal to the number of light sensing elements 44 in detector 42. The position within one pitch of platen 12 is determined from the ratio of the solutions of equations (2) and (3) defined as follows:

$$\phi \tan^{-1}(F_I/F_R) \quad (4)$$

where $F_R$ and $F_I$ are determined from equations (2) and (3), respectively. The solution to equation (4), φ, is called the fractional phase angle and merely provides information concerning the position of head 16 within one platen pitch.

To determine the position of head 16 on platen 12, a wrapping function is employed in which a standard Nyquist sampling technique is used to determine whether a fractional change between two successively occurring fractional phase angles exceeds a predetermined quantity and is defined as follows:

$$\Delta\phi = \phi_n - \phi_{n-1} \quad (5)$$

where $\phi_n$ represents the current value of a fractional phase angle and $\phi_{n-1}$ represents the previous fractional phase angle. If Δφ exceeds a predetermined threshold value of π radians maximum, the head 16 is considered to have moved through a pitch boundary. This requires updating a counter 90 which is in electrical communication with processor 77. If Δφ>0, then the motion is considered to be in the negative δ direction, and counter 90 is decremented by 1. If Δφ<0, the motion is considered to be in the positive δ direction and counter 90 is incremented by 1. The precise position of head 16 with respect to platen 12 is determined by processor 77 summing the integers present in counter 90 along with the value of equation (4). This positioning information may be used in a feedback control system 92, to control head 16 movement. In this manner, a highly versatile and accurate position sensor for linear motors is provided.

Referring to FIGS. 1 and 7, it is preferred that rotor 16 include at least three optical channels 24; however, the number of channels may vary depending upon the application. For purposes of this discussion rotor 16 is depicted as having four optical channels, with the detector of each shown as 42, 142, 242 and 342. Detector 42 has a longitudinal axis 46 and detector 242 has a longitudinal axis 246. The optical channels associated with detectors 42 and 242 are orientated so that the axis corresponds to the Y axis. In this fashion, detectors 42 and 242 sense motion along the Y-axis with longitudinal axes 46 and 246 extending parallel thereto. Detector 142 has a longitudinal axis 146, and detector 342 has a longitudinal axis 346. Longitudinal axes 146 and 346 extend parallel to the X-axis. In this fashion, the δ-axis of the optical channels associated with detectors 142 and 342 corresponds to the X-axis, allowing motion along this axis to be sensed. The rotor 16 and optical channels form a rigid body, which due to the nature of Sawyer motors, can exhibit both translational and rotational motion in the X-Y plane.

The translation and rotation of rotor 16 is determined by tracking the rotor center "C" with respect to platen 12. Assume that the platen 12 lies in the X-Y plane with grooves 18 of pattern 14 initially extending parallel to the y-axis. The rotor 16 is initially aligned with the platen, as represented by vectors a and β, parallel with the y-axis. If the rotor 16 is displaced in X and Y from its starting position on platen 12, and rotated by an angle φ relative to the y-axis, as shown by vectors γ and ν, then detectors 142 and 342 will produce respective measurement along the x-axis of $X_{142}$ and $X_{342}$, while detectors 42 and 242 will produce respective measurements along the y-axis of $Y_{42}$ and $Y_{242}$. From FIG. 7, it can be seen that detector 142 is retarded by dx along the x-axis, while detector 342 is advanced by dx along the x-axis. For the case of four sensors mounted symmetrically about the center "C", the x-axis and y-axis position and the rotation φ of the center "C" of rotor 16 are computed as follows:

$$X_c = (X_{142} + X_{342})/2 \quad (6)$$

$$Y_c = (Y_{42} + Y_{242})/2 \quad (7)$$

and $$\phi = \tan^{-1}[(X_{142} - X_{342})/d] \quad (8)$$

or $$\phi = \tan^{-1}[(Y_{242} - Y_{42})/d] \quad (9)$$

From the foregoing, it is seen that the rotational movement of rotor 16 may be determined from either equation 8 or 9. Thus, either equation can be eliminated, which allows achieving the same information concerning the translational and rotational movement of rotor 16 by employing only three sensors mounted on three different sides of rotor 16. If sensor 242 were eliminated, then equation 7 is replaced with equation 10 for determining y-axis position as follows:

$$Y_c = Y_{42} + (X_{142} - X_{342})/2 \tag{10}$$

It is preferred that the two sensors used to determine rotation also measure displacement along the same axis, and that they be mounted to rotor 16 with a displacement relative to each other in the transverse axis. The exact form of equations 6, 7, 8 and 9 is determined by the sensor mounting locations relative to the rotor center "C" and might differ by application.

Referring to FIGS. 8A and 8B, an alternate embodiment of optical channel 524 is shown with a one-dimensional light concentrator 536 disposed along optical axis 534, between detector 542 and objective lens 532. The one-dimensional light concentrator 536 consists of two surfaces 536a and 536b which are disposed in opposing relation. The mirrored surfaces 536a and 536b are disposed spaced-apart from, and on opposite sides of optical axis 534. The mirrored surfaces 536a and 536b extend upwardly and outwardly from detector 542, forming an angle Φ with respect to optical axis 534. In this fashion, mirrored surfaces 536a and 536b define an entrance aperture 536c disposed proximate to objective lens 532, as well as an exit aperture 536d, disposed proximate to detector 542. A longitudinal axis 536e of one-dimensional concentrator 536 extends parallel to longitudinal axis 546 of detector 542 and lies in the unpowered plane of one-dimensional concentrator 536. A traverse axis 536f lies in the powered plane of one dimensional concentrator 536. It is preferred that the entrance aperture 536c be at least as wide as the diameter of objective lens 532 to maximize collection efficiency. This often necessitates extending the length "l" of the one dimensional concentrator 536 along optical axis 534 a substantial distance to optimize angle φ.

As seen from FIGS. 9A and 9B, the configuration of mirrored surfaces 536a and 536b varies the optical path that light rays must traverse before impinging upon detector 542. Specifically, light rays 598a traveling from entrance aperture 536c to exit aperture 536d, as viewed in the unpowered plane of FIG. 9A, are not deflected in this plane. To that end, light rays 598a, which correspond to points A, B, and C, are focused to points A', B' and C' lying in an image plane 571 at focal length 572 defined by objective lens 532. Light rays 598b, which correspond to point Z, travelling from entrance aperture 536c to exit aperture 536d as viewed in the powered plane of FIG. 10A undergo multiple reflections in this plane. Typically, light rays 598b result in nearly focused images Z' on detector 542. This necessitates having the width "wd", measured perpendicular to longitudinal axis 546 of the pixel 544 of detector 542, be larger than the width "wi" of the exit aperture 536d, as measured along a parallel direction. In this fashion, information concerning periodicity of an image may be removed in one direction while being preserved in a transverse direction.

Referring to FIGS. 10A and 10B, the one-dimensional concentrator 636 may be used in conjunction with cylindrical lens 136. The one-dimensional concentrator 636 is disposed between detector 42 and cylindrical lens 136 and is orientated as discussed above with respect to FIGS. 8A and 8B. By employing cylindrical lens 136 with the one-dimensional concentrator 636, the aforementioned spatial requirements of the entrance 636c and exit 636d apertures may be relaxed. In this fashion, the length "λ" of one-dimensional concentrator 636 need not extend along optical axis 34 as great a distance, as discussed above with respect to FIGS. 10A and 10B. Cylindrical lens 136 collects the light propagating through objective lens 32, allowing entrance aperture 536c to be substantially smaller in size.

Figure 11:
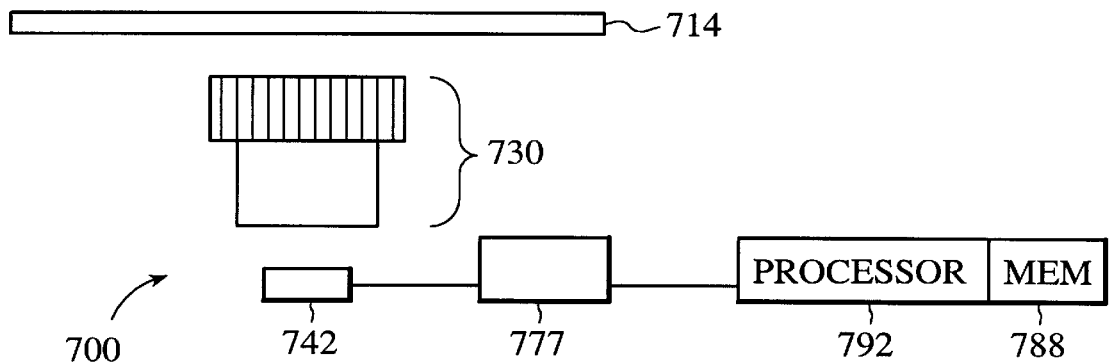
FIG. 11 is a simplified plan view of an imaging system for the linear motor shown in FIG. 1, in accord with an embodiment employing anamorphic filtering using data manipulation techniques.

Referring to FIG. 11, data manipulation techniques may be employed to achieve anamorphic filtering. A standard optical system 700 would be employed consisting of an illumination and collection optics 730 in optical communication with a two-dimensional area CCD array 742 and standard digitizing electronics 777 in data communication with a processor 792. The processor 792 is adapted to create image information corresponding to the data transmitted by the digitizing electronics 777. The lens assembly is designed to provide a field of view matching the area of the pixels in the CCD 742. Preferably, the optics 730 would produce an accurate reproduction of the platen 714 at any magnification desired, depending upon the application. The processor 792 may have stored in memory 788 a sub-routine of a computer program to be operated on by the processor 792 to function as an anamorphic filtering system, attenuating information with respect to movement along one direction while preserving information concerning movement along a transverse direction.

Figure 12:
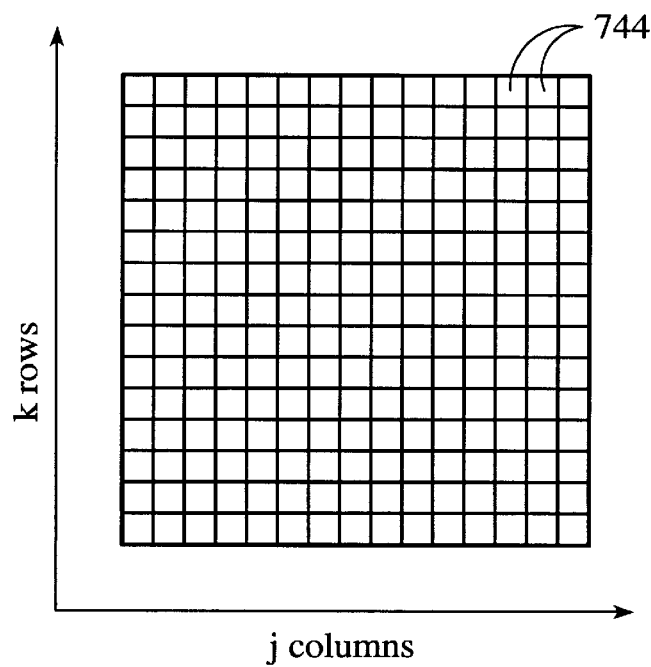
FIG. 12 is a plan view of an arrangement of pixels of a two-dimensional CCD array shown in FIG. 11.

Referring to FIGS. 11 and 12, CCD 742 includes k rows and j columns of pixels 744. The data generated by each of the aforementioned pixels 744 would be stored in memory 788 as a k×j array of pixel_data. The sub-routine would compute the output_data as follows:

$$\text{output\_data}[i] = 1/k \times \sum_{n=1}^{k} \text{pixel\_data}[n, i] \tag{14}$$

here k corresponds to the number of rows of pixel information in memory 788. The sub-routine produces output_data having as many elements j as the pixel_data in memory 788 has columns, thereby producing a one-dimensional array of j numbers. In this fashion, the average value of all k pixels of pixel_data in one column is measured. This removes information in one direction, i.e., along the q-axis, while preserving information along the δ-axis. The aforementioned data manipulation may also be achieved without employing a sub-routine of a computer program by using custom readout electronics or binning techniques associated with binning CCD or binning PD detectors.

I claim:

1. A sensor for detecting a position of a moveable body relative to a starting position, said sensor comprising:

a platen spaced apart from said body, said platen including a pattern of optically contrasting lines having a two-dimensional periodicity, defining a two-dimensional line array;

a source directing light onto said line array causing light to emerge therefrom propagating along a path, with said emerging light corresponding to an image of an area of said two-dimensional line array;

a detector, in fixed relation to said body, having a longitudinal axis, said detector positioned in said path to sense said image;

means, in data communication with said detector, for anamorphically filtering said image wherein information corresponding to a periodicity of said image in a first direction is removed, while preserving information corresponding to a periodicity of said image in a second direction, defining a one-dimensional image, with said second direction being transverse to said first direction; and means, connected to receive information corresponding to said one-dimensional image, for producing data indicating a position of said body in one direction with respect to said starting position, with said starting position being located on said platen.

2. The sensor as recited in claim 1 wherein said filtering means includes a cylindrical lens disposed in said path, having a major axis orientated to extend parallel to said longitudinal axis.

3. The sensor as recited in claim 1 wherein said filtering means includes a one-dimensional concentrator disposed in said path.

4. The sensor as recited in claim 1 wherein said filtering means includes a cylindrical lens and a one-dimensional concentrator, said cylindrical lens being disposed in said path and having a major axis orientated to extend parallel to said longitudinal axis, said one-dimensional concentrator including two spaced-apart mirrors, each of which faces the other, said spaced-apart mirrors being disposed on opposite sides of said path.

5. The sensor as recited in claim 1 wherein said filtering means includes an anamorphic lens assembly defining an exit pupil and powered and unpowered optical planes, with each of said powered and unpowered planes being associated with a fixed object distance, and light rays traveling in said unpowered plane coming to focus at a first image distance, defining a focal area and light rays traveling in said powered plane converging at said exit pupil, with said exit pupil and said detector disposed proximate to said focal area.

6. The sensor as recited in claim 1 wherein said image of said two-dimensional line array includes a plurality of high and low intensity areas having a periodicity along two orthogonal axes, and said filtering means including an objective lens optically coupled to a cylindrical lens, with said cylindrical lens defining powered and unpowered planes, and a periodicity of said two-dimensional image parallel to said powered plane being compressed, thereby removing information corresponding thereto.

7. The sensor as recited in claim 1 wherein said pattern defines a periodic waveform and said producing means includes a processor, electronically coupled to a memory, with said memory storing a program means, to be operated on by said a processor, for determining a fractional phase angle as a function of said periodic waveform.

8. The sensor as recited in claim 1 wherein said detector includes a two-dimensional area of pixels arranged in k rows and j columns with each of said pixels adapted to produce data corresponding to a portion of said image sensed, said filtering means including a processor and first and second memories, with said first memory adapted to store said data as a k×j array of pixel_data and said second memory storing a subroutine of a computer program to be operated on by said processor to produce an averaged value of all the k pixels of data associated with each column j, thereby removing periodic information of said image along one axis while preserving periodic information of said image along a transverse axis.

9. A sensor for detecting a position of a moveable body relative to a starting position, said sensor comprising:

a platen spaced apart from said body, said platen including a pattern of optically contrasting lines which is periodic along two transverse directions, defining a two-dimensional line array;

a source directing light onto said line array causing light to emerge therefrom and propagate along a path, with said emerging light corresponding to an image of an area of said two-dimensional line array;

first means, in said path, for anamorphically filtering said image with information corresponding to a periodicity of said image in a first direction being removed while preserving information corresponding to a periodicity of said image in a second direction;

second means, in said path, for anamorphically filtering said image with information corresponding to a periodicity of said image in said second direction being removed while preserving information corresponding to a periodicity of said image in said first direction, with said second direction being transverse to said first direction; and means, in data communication with both said first and second filtering means, for producing information indicating a position of said body in said first and said second direction with respect to said starting position, with said starting position being located on said platen.

10. The sensor as recited in claim 9 wherein said first and second filtering means each includes a detector in fixed relation to said body and having a longitudinal axis and a cylindrical lens having a major axis extending parallel to said longitudinal axis, with said longitudinal axis of said detector associated with said first filtering means extending transverse to said longitudinal axis of said detector associated with said second filtering means.

11. The sensor as recited in claim 9 wherein said first and second filtering means each includes an objective lens defining an optical axis, a detector in fixed relation to said body and having a longitudinal axis and a one-dimensional concentrator having two spaced-apart mirrors, each of which is disposed on opposite sides of said optical axis, with said longitudinal axis of said detector associated with said first filtering means extending transverse to said longitudinal axis of said detector associated with said second filtering means.

12. The sensor as recited in claim 9 wherein said first and second filtering means each includes an objective lens defining an optical axis, a detector in fixed relation to said body and having a longitudinal axis, a one-dimensional concentrator and a cylindrical lens disposed between said detector and said one-dimensional concentrator, with said one-dimensional concentrator having two spaced-apart mirrors, each of which is disposed on opposite sides of said optical axis, with said longitudinal axis of said detector associated with said first filtering means extending transverse to said longitudinal axis of said detector associated with said second filtering means.

13. The sensor as recited in claim 9 wherein said first and second filtering means each includes a detector in fixed relation to said body and having a longitudinal axis and an anamorphic lens assembly defining an exit pupil and powered and unpowered focal planes, with each of said powered and unpowered planes associated with a fixed object distance, so that light rays traveling in said unpowered plane come to focus at a first image distance, defining a focal area, and light rays traveling in said powered plane converge at said exit pupil, with said exit pupil and said detector disposed proximate to said focal area.

14. The sensor as recited in claim 13 wherein said unpowered plane associated with said first filtering means extends parallel to said powered plane associated with said second filtering means.

15. The sensor as recited in claim 9 wherein said first and second filtering means each includes a detector in fixed relation to said body and having a two-dimensional area of pixels arranged in k rows and j columns with each of said pixels adapted to produce data corresponding to a portion of said image sensed, a processor and first and second memories, with said first memory adapted to store said data as a k×j array of pixel_data and said second memory storing a subroutine of a computer program to be operated on by said processor to produce an averaged value of all the k pixels of data associated with each column j, thereby removing periodic information of said image along one axis while preserving periodic information of said image along a transverse axis.

16. The sensor as recited in claim 10 further including a third means, in said path, for anamorphically filtering said image, with information corresponding to a periodicity of said pattern in said first direction being removed while preserving information corresponding to a periodicity of said image in said second direction, with said third filtering means including an additional detector in fixed relation to said body and having an additional longitudinal axis and an additional cylindrical lens having an additional major axis extending parallel to said additional longitudinal axis, with said additional longitudinal axis of said additional detector extending perpendicular to said first direction, said first and third filtering means adapted to sense movement of said body along said second direction, with said third filtering means being spaced apart, in said first direction, from said first filtering means.

17. A sensor to detect a position of a moveable head of a linear motor with respect to a starting position located on a platen, said platen including a surface having a pattern of optically contrasting lines arranged to form a two-dimensional line array of optically responsive areas, said sensor comprising:

a source adapted to direct light onto said array causing light to emerge therefrom propagating along a path, with said emerging light corresponding to said two-dimensional line array, forming an image having periodicity in two directions;

means for simultaneously imaging said image as two images having periodicity in one direction with each of said two images containing information mutually exclusive of information contained by the remaining image having periodicity in one direction, said information corresponding to movement of said head relative to said starting position; and means, in data communication with said simultaneously imaging means, for producing digital signals corresponding to both a translational and a rotational position of said head with respect to said starting position.

18. The sensor as recited in claim 17 wherein said simultaneously imaging means includes first and second optical channels each of which includes a detector in fixed relation to said head and having a longitudinal axis and a cylindrical lens having a major axis extending parallel to said longitudinal axis, with said longitudinal axis of said detector associated with said first optical channel extending transverse to said longitudinal axis of said detector associated with said second optical channel.

19. The sensor as recited in claim 17 wherein said simultaneously imaging means includes first and second optical channels each of which includes an objective lens defining an optical axis, a detector in fixed relation to said head and having a longitudinal axis and a one-dimensional concentrator having two spaced-apart mirrors, each of said spaced-apart mirrors being disposed on opposite sides of said optical axis, with said longitudinal axis of said detector associated with said first optical channel extending transverse to said longitudinal axis of said detector associated with said second optical channel.

20. The sensor as recited in claim 17 wherein said simultaneously imaging means includes first and second optical channels each of which includes an objective lens defining an optical axis, a detector having a longitudinal axis, a one-dimensional concentrator and a cylindrical lens disposed between said detector and said one-dimensional concentrator, with said cylindrical lens having a major axis and said one-dimensional concentrator having two spaced-apart mirrors, each of said spaced-apart mirrors being disposed on opposite sides of said optical axis, with both said longitudinal and said major axes associated with said first optical channel extending transverse to both said longitudinal and said major axes of said detector associated with said second optical channel.

* * * * *